US00RE38489E

(19) United States
(12) Reissued Patent
Thony et al.

(10) Patent Number: US RE38,489 E
(45) Date of Reissued Patent: Apr. 6, 2004

(54) SOLID MICROLASER PASSIVELY SWITCHED BY A SATURABLE ABSORBER AND ITS PRODUCTION PROCESS

(75) Inventors: Philippe Thony, St. Joseph de Riviere (FR); Engin Molva, Grenoble (FR); Bernard Ferrand, Voreppe (FR); Corinne Borel, Paris (FR)

(73) Assignee: Commissariat a l'Energie Atomique, Paris (FR)

(21) Appl. No.: 10/067,877

(22) Filed: Feb. 8, 2002

Related U.S. Patent Documents

Reissue of:
(64) Patent No.: 6,023,479
Issued: Feb. 8, 2000
Appl. No.: 09/003,462
Filed: Jan. 6, 1998

(30) Foreign Application Priority Data

Jan. 30, 1997 (FR) ..... 97 01010

(51) Int. Cl.[7] ..... H01S 3/113; G01C 3/00; H01L 21/20

(52) U.S. Cl. ..... 372/11; 372/39; 372/43; 372/50; 372/70; 372/71; 372/72; 372/92; 372/98; 356/3; 356/5.01; 437/129

(58) Field of Search ..... 372/39, 40, 43, 372/44, 49, 50, 70, 71, 72, 92, 98, 11, 21; 356/3, 3.01, 5.01; 437/129

(56) References Cited

U.S. PATENT DOCUMENTS 5,394,413 A * 2/1995 Zayhowski ..... 372/10
5,495,494 A * 2/1996 Molva et al. ..... 372/98
5,502,737 A * 3/1996 Chartier et al. ..... 372/11
5,557,624 A 9/1996 Stultz et al. ..... 372/11
5,654,973 A 8/1997 Stultz et al. ..... 372/10
5,754,333 A * 5/1998 Fulbert et al. ..... 359/330
5,832,010 A * 11/1998 Fulbert et al. ..... 372/22
5,844,932 A * 12/1998 Thony et al. ..... 372/92
5,889,798 A * 3/1999 Molva et al. ..... 372/12
5,912,728 A * 6/1999 Besesty et al. ..... 356/5.01
5,933,444 A * 8/1999 Molva et al. ..... 372/75
5,982,802 A * 11/1999 Thony et al. ..... 372/75
6,023,479 A * 2/2000 Thony et al. ..... 372/11

FOREIGN PATENT DOCUMENTS

EP 0 653 824 5/1995 ..... 372/10 X
EP 0 657 976 6/1995 ..... 372/10 X
EP 0 724 316 7/1996 ..... 372/10 X
FR 1448892 7/1966 ..... 372/10 X

OTHER PUBLICATIONS

Marty B. Camargo, et al., Optics Letters, vol. 20, No. 3, pp. 339–341, Feb. 1, 1995, "$CO^{2+}$:YSGG Saturable Absorber Q Switch for Infrared Erbium Lasers".

Emmanuelle Daran, et al., INSA Toulouse, pp. 57–60 and 64–76, Apr. 28, 1994, "$CAF_2$: ER Epitaxie par Jets Moleculaires: Proprietes Optiques en Relation Avec les Parametres D'Elaboration".

(List continued on next page.)

*Primary Examiner*—Brian Healy
(74) *Attorney, Agent, or Firm*—Oblon, Spivak, McClelland, Maier & Neustadt, P.C.

(57) ABSTRACT

The invention relates to a microlaser cavity (10) having:

a solid active medium (2) emitting at least in a wavelength range between 1.5 and 1.6 $\mu$m, and a saturable absorber (4) of formula $CaF_2:Co^{2+}$ or $MgF_2:Co^{2+}$ or $SrF_2:Co^{2+}$ or $BaF_2:Co^{2+}$ or $La_{0.9}Mg_{0.5-x}Co_xAl_{11.433}O_{19}$ or $YalO_3:Co^{2+}$ (or $[YAl_{5-2x}Co_xSi_xO_3]$ $YAl_{(1-2x)}Co_xSi_xO_3$) or $Y_3Al_{5-x-y}Ga_xSc_yO_{12}:Co^{2+}$ (or $[_{-3}Al_{5-x-y2z}Ga_xSc_yCo_zSi_zO_{12}]$ $Y_3Al_{5-x-y-2z}Ga_xSc_yCo_zSi_zO_{12}$) or $Y_{3-x}Lu_xAl_5O_{12}:Co^{2+}$ (or $Y_{3-x}Lu_xAl_{5-2y}Co_ySi_yO_3$) or $[Sr_{1-x}Mg_xLa_yAl_{12-y}O_{12}:Co^{2+}$ (or $Sr_{1-x}Mg_{x-y}Co_yLa_zAl_{12-z}O_{12}$, with $0<y<x$)] $Sr_{1-x}La_xMg_xAl_{12-x}O_{19}:Co^{2+}$ (*or* $Sr_{1-x}La_xMg_{x-y}Co_yAl_{12-x}O_{19}$, *with* $0<y<x$).

23 Claims, 2 Drawing Sheets

OTHER PUBLICATIONS

C. Borel, These de Doctorat de L'Universite Pierre et Marie Curie Paris VI, pp. 43, 45–48, Nov. 12, 1990, "Critallogense et Caracterisation D'Hexaaluminates de Lanthane Dopes Aux Jons Chrome et Titane, Pour la Realisation de Nouveaux Lasers Solides Accordables".

Q. He, et al., SPIE, vol. 1794, pp. 303–308, 1992, "Rare Earth ($Nd^{3}$+,$Er^{3+}$ and $Yb^{3+}$) Doped Aluminum Phosphate Sol–Gel Films".

A. Eda, et al., CLEO'92, pp. 282, May 1992, "CWG33 Microchip Lasers Fabricated by a Novel Photolithography Technique".

* cited by examiner

SOLID MICROLASER PASSIVELY SWITCHED BY A SATURABLE ABSORBER AND ITS PRODUCTION PROCESS

Matter enclosed in heavy brackets [ ] appears in the original patent but forms no part of this reissue specification; matter printed in italics indicates the additions made by reissue.

TECHNICAL FIELD AND PRIOR ART

The present invention relates to a solid microlaser, a cavity for said microlaser and a process for the production of said cavity.

One of the advantages of the microlaser is its structure in the form of a stack of multilayers. The active laser medium is constituted by a material of limited thickness between 150 and 1000 $\mu$m and small dimensions (a few $mm^2$), on which are directly deposited dielectric cavity mirrors. This active medium can be pumped by a III–V laser diode, which is either directly hybridized on the microlaser, or coupled to the latter by an optical fibre. The possibility of collective production using microelectronic means allows a mass production of such microlasers at very low cost.

Microlasers have numerous applications in fields as varied as the car industry, the environment, scientific instrumentation and telemetry.

Known microlasers generally have a continuous emission of a few dozen mW power. However, most of the aforementioned applications require peak powers (instantaneous power) of a few kW delivered for $10^{-8}$ to $10^{-9}$ seconds, with a mean power of a few dozen mW. In solid lasers, it is possible to obtain such high peak powers by making them operate in the pulsed mode at frequencies between 10 and $10^4$ Hz. For this purpose use is made of well known switching methods, e.g. the Q-switch.

More specifically, the switching of a laser cavity consists of adding to it time-variable losses, which will prevent the laser effect for a certain time during which the pumping energy is stored in the excited level of the gain material. These losses are suddenly reduced at precise moments, thus feeing the stored energy in a very short time (giant pulse). Thus, a high peak power is obtained.

In the case of so-called active switching, the value of the losses is externally controlled by the user (e.g. intracavity electrooptical or acoustooptical, rotary cavity mirror changing either the path of the beam, or its polarization state). The storage time, the time of opening the cavity and the repetition rate can be independently chosen. However, this requires adapted electronics and makes the laser system more complicated. An actively switched microlaser is described in EP-724 316.

In the case of so-called passive switching, variable losses are introduced into the cavity in the form of a material known as a saturable absorber (S.A.), which is highly absorbant at the laser wavelength and has a low power density and which becomes virtually transparent when said density exceeds a certain threshold, which is called the S.A. saturation intensity.

A passively switched microlaser is described in EP-653 824.

The latter document more particularly describes a microlaser having:

a solid active medium, which can be constituted by a base material chosen from among $Y_3Al_5O_{12}$, $LaMgAl_{11}O_{19}$, $YVO_4$, $Y_2SiO_5$, $YLiF_4$ or $GdVO_4$, doped with erbium (Er) or an erbium-ytterbium (Er—Yb) codoping), a saturable absorber deposited by liquid phase epitaxy directly on the solid active medium and constituted by a base material, identical to that of the solid active medium, and doped with $Er^{3+}$ ions.

This microlaser makes it possible to obtain an emission length of approximately 1.5 $\mu$m. This emission length has a particular interest, particularly in the field of optical telecommunications. The diversity of specific applications in this field makes it necessary to have other microlaser sources making it possible to emit at or close to this wavelength.

The article by M. B. Camargo et al entitled "$Co^{2+}$:YSGG saturable absorber Q-switch for infrared erbium lasers", published in Optics Letters, vol. 20, No. 3, pp 339–341, 1995, describes; a laser passively switched with the aid of a saturable absorber $Co^{2+}:Y_3Sc_2Ga_3O_{12}$ and a saturable absorber $Co^{2+}:Y_3Al_5O_{12}$. Thus, it is a saturable absorber based on YAG or YSGG and doped with $Co^{2+}$. However, for the reentry of a $2^+$ charging ion, it is necessary to carry out a charge compensation of the substrate with a $4^+$ ion (charged four times positively), in order to maintain the neutrality of the compound. This charge compensation problem is made all the more difficult to solve in that the crystals described in the article by M. B. Carmago et al are firstly produced in solid form and are then cut up into sections. Moreover, the method described in this document for producing the crystal (Czochralski method) limits the concentration of dopants which it is possible to introduce into the matrix, as a result of stability problems. Finally, this document provides no specific construction for an operation with a high repetition frequency.

DESCRIPTION OF THE INVENTION

In order to solve these problems, the invention relates to a monolithic, solid microlaser emitting at at least one wavelength in the infrared range exceeding 1.5 $\mu$m and which supplies a pulsed beam by a passive switching process. Such a device will preferably operate at a high repetition frequency. The microlaser is formed from at least two materials, namely a solid amplifier medium and a saturable absorber medium, or which serves the purpose of a saturable absorber, i.e. a self-modulated loss modulator.

The invention relates to a microlaser cavity having a solid active medium emitting at least in a wavelength range between 1.5 and 1.6 $\mu$m and a saturable absorber of formula $CaF_2:Co^2+$ or $MgF_2:Co^{2+}$ or $SrF_2:Co^{2+}$ or $BaF_2:Co^{2+}$ or $La_{0.9}Mg_{0.5-x}Co_xAl_{11.433}O_{19}$ or $YAlO_3:Co^{2+}$ (or [$YAl_{5-2x}Co_xSi_xO_3$] $YAl_{(1-2x)}Co_xSi_xO_3$) or $Y_3Al_{5-x-y}Ga_xSc_yO_{12}:Co^{2+}$ (or $Y_3Al_{5-x-y-2z}Ga_xSc_yCO_zSi_zO_{12}$) or $Y_{3-x}Lu_xAl_5O_{12}:Co^{2+}$ (or $Y_{3-x}Lu_xAl_{5-2y}Co_ySi_yO_3$) or [$Sr_{1-x}Mg_xLa_yAl_{12-y}O_{12}:Co^{2+}$ (or $Sr_{1-x}Mg_{x-y}Co_yLa_zAl_{12-z}O_{12}$, with o<y 21 x)] $Sr_{1-x}La_xMg_xAl_{12-x}O_{19}:Co^{2+}$ (*or* $Sr_{1-x}La_xMg_{x-y}Co_yAl_{12-x}O_{19}$, *with* $0<y<x$).

All these saturable absorber compositions make it possible to obtain a saturable absorber element in thin film form, e.g. by molecular beam epitaxy, or by sol-gel deposition. The films have the advantage of being stressed more easily than solid structures.

Moreover, the compositions $CaF_2:Co^{2+}$, $MgF_2:Co^{2+}$, $SrF_2:Co^{2+}$, $BaF_2:Co^{2+}$ or $La_{0.9}Mg_{0.5-x}Co_xAl_{11.433}O_{19}$ do not require a charge compensation, due to the introduction of cobalt as a dopant. Consequently, the saturable absorber can be a film with a thickness between e.g. 1 and 200 $\mu$m (e.g. between 5 and 150 $\mu$m).

A microlens can be provided on one of the faces of the microlaser, which makes it possible to stabilize the cavity and helps to lower the operating threshold of the microlaser.

The saturable absorber can be combined with the amplifier medium or solid active medium by various processes:

by assembly with an optical adhesive or a resin bead, by deposition in film form (e.g. a $Co^{2+}$-doped sol-gel film, or a $Co^{2+}$-doped, epitaxied film), or by a mixture of the two processes involving firstly a deposition on a substrate which is not the laser material, followed by the assembly of said substrate with the amplifier medium, after which the film substrate can be removed, or it can already contain one of the mirrors of the microlaser cavity.

Thus, the saturable absorber can be a material of different types:

a crystal doped with a saturable absorber ion (e.g. $Co^{2+}$-doped LMA), a monocrystalline film doped with a saturable absorber ion (e.g. LMA:$Co^{2+}$, or $CaF_2$:$Co^{2+}$ or $MgF_2$:$Co^{2+}$ or $SrF_2$:$Co^{2+}$ or $BaF_2$:$Co^{2+}$), e.g. deposited by liquid phase epitaxy on the laser crystal, which is matrix or stress-matched, a sol-gel film deposited on the laser material and doped with a $Co^{2+}$ saturable absorber ion.

The microlaser or microlaser cavity according to the invention can operate at a high repetition frequency (≧100 or 200 Hz).

The invention also relates to a process for the production of a device as described hereinbefore.

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS OF THE INVENTION

Figure 1:
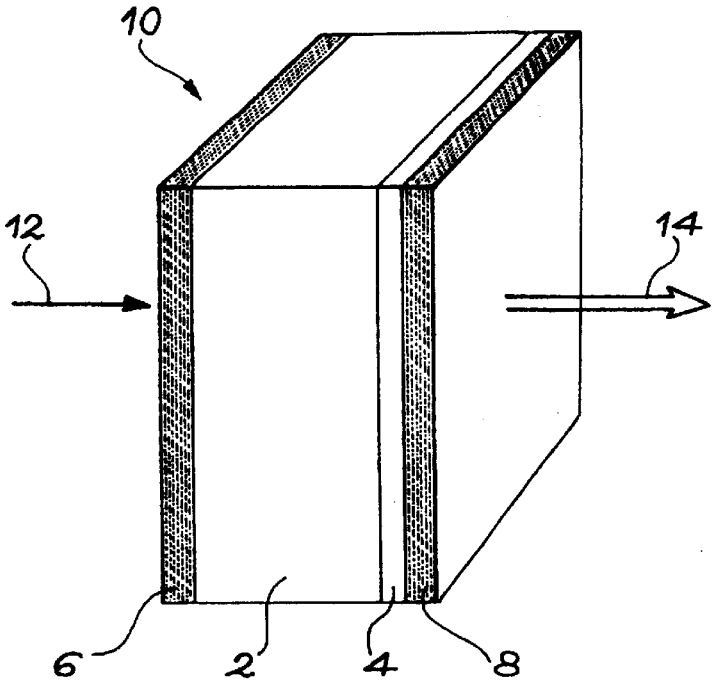
FIG. 1 Diagrammatically a microlaser according to the invention.

A microlaser or microlaser cavity according to the invention is shown in FIG. 1 and has a solid active medium 2 and a saturable absorber 4. These two elements are placed between two mirrors 6, 8, which seal the laser cavity. Reference numeral 10 designates the complete cavity and 12 and 14 respectively designate a pumping beam of the microlaser cavity and an emitted beam.

A microlaser according to the invention is combined with cavity pumping means, which are not shown in the drawing.

The constituent material of the active medium 2 is e.g. doped with erbium (Er) for a laser emission of approximately 1.5 $\mu$m. This material could e.g. be chosen from among the following materials:

YAG ($Y_3Al_5O_{12}$), LMA ($LaMgAl_{11}O_{19}$), YSO ($Y_2SiO_5$), YSGG ($Y_3Sc_2Ga_3O_{12}$), $GdVO_4$, SYS ($SrY_4(SiO_4)_3O$), CAS ($Ca_2Al_2SiO_7$), etc. This choice will be conditioned by a certain number of criteria, but will also depend on the applications envisaged. Among these criteria, reference can be made to the following:

a high absorption coefficient at the pumping wavelength (e.g. III–V laser diode emitting at about 980 nm), for increasing the pumping efficiency, whilst still maintaining a limited material thickness (<1 mm);

a wide absorption band at the wavelength of the pumping beam, in order to deal with the problem of wavelength stabilization of the laser diode, thereby simplifying the choice and electrical control of the laser pumping diode;

a large, stimulated, effective emission cross-section for obtaining high efficiency and high output powers;

a small emission band width to easily obtain a monofrequency laser, or conversely a broad emission band to achieve a frequency-tunable laser emission;

good thermomechanical properties in order to simplify the machining of the material and to limit prejudicial thermal effects by a good evacuation of the heat produced by the absorption of the pump (this excess heat will depend on the energy efficiency of the laser);

a long life in the excited state for a high energy storage, or a short life for a rapid switching rate;

the possibility of finding the material in large sizes in order to be able to simultaneously collectively produce the largest number possible of microlasers with one laser crystal.

In general, none of the known materials simultaneously satisfies all these criteria. However, among the known materials, those which are more particularly adapted to the operation of the microlaser, particularly in the case of a $Nd^{3+}$ doping, are (with comparable life periods of a few hundred microseconds):

$YVO_4$, which has a good coefficient, a wide absorption band a good effective cross-section, but a poor thermal conductivity, whilst it is only obtained in small sizes and is also fragile;

YAG, whose absorption coefficient and effective, stimulated emission section are average and whose emission and absorption band widths are small, but is available in large sizes and with a good thermal conductivity;

LMA, which offers low effective cross-section and absorption coefficient, but wide absorption and emission bands, whilst being of large size, but poor thermal conductivity.

Another possible material is phosphate glass doped with erbium (doping between 0.5 and 0.9% oxide) and ytterbium (between 15 and 20% oxide).

For an emission at 1.5 $\mu$m and higher, a choice will be made of active ions, e.g. from among erbium (Er) or chromium (Cr) or an erbium-ytterbium (Er+Yb) codoping or an erbium-ytterbium-cerium (Er+Yb+Ce) codoping. Compared with doping using erbium alone, Er+Yb codoping makes it possible to absorb more pumping energy. The Yb ion then absorbs the pumping beam and transfers the energy to the Er ion.

Erbium-doped materials have an emission band at a wavelength of around 1.5 $\mu$m. This band is relatively wide and in glass reaches a width of 25 nm. It can be more or less wide and more or less displaced as a function of the matrix doped with the erbium ion. Thus, in YAG, the band is centred at around 1.64 $\mu$m.

In a laser, the erbium ion has a precise emission wavelength, but which varies within said band. Thus, in a glass doped with Er—Yb wavelengths from 1.53 to 1.58 $\mu$m have been observed. This is explained by the fact that the clear gain of the laser varies with its pumping power and its maximum is displaced.

The clear gain is obtained by subtracting the losses by absorption from the gain of the amplifier medium. The erbium ion gives three level laser systems. This means not only that the laser medium has gain at the wavelength, but also has losses by absorption at said same wavelength. When the laser operates, there are simultaneously losses and gain on the part of the laser medium. However, these two phenomena are of varying amplitude as a function of the operating wavelength. They are also dependent on parameters of the laser. Thus, the situation can arise that for a certain configuration (fixed by the pumping power, the length and concentration of the laser material, the transmission of the mirrors and the losses of the cavity), the clear gain is less great than in another configuration for a given wavelength. For another configuration, the maximum, clear gain wavelength will differ. In particular, it is possible to vary said wavelength by varying the pumping power.

For further details of the thickness e of the active medium 2, reference can be made to EP-653 824, which gives typical thicknesses of laser media for a monomodal operation, as well as the relationship between the thickness and the number of modes.

The saturable absorber can be chosen from among the following compounds:

$CaF_2$ doped with cobalt ($CaF_2:Co^{2+}$), or compounds of the same family: $MgF_2:Co^{2+}$, $SrF_2:Co^{2+}$, $BaF_2:Co^{2+}$.

Compounds from the LMA family ($LaMgAl_{11}O_{19}$) doped with cobalt, e.g. in a proportion greater than 0.1% (e.g. 0.3 or 0.15%) and lower than 1% (e.g. 0.4%). A doping with 0.3% cobalt $Co^{2+}$ ions was carried out in LMA of formula $La_{0.9}Mg_{0.5}Al_{11.433}O_{19}$, the material, after doping, having the formula: $La_{0.9}Mg_{0.4985}Co_{0.0015}Al_{11.433}O_{19}$. The general formula of the doped material is: $La_{0.9}Mg_{0.5-x}Co_xAl_{11.433}O_{19}$. It is also possible to start with stoichiometric LMA (of formula $LaMgAl_{11}O_{19}$) and the formula after doping is $LaMg_{1-x}Co^xAl_{11}O_9$). A certain variation around these different compositions is possible.

The compound [$Sr_{1-x}Mg_xLa_yAl_{12-y}O_{19}$] $Sr_{1-x}La_xMg_xAl_{12-x}O_{19}$ (or ASL) doped with cobalt, whereby in said compound, which is a solid solution between $SrAl_{12}O_{19}$ and $LaMgAl_{11}O_{19}$ (LMA), the cobalt ion replaces the magnesium ion (Mg) (formula of the doped material: [$Sr_{1-x}Mg_{x-z}Co_zLa_yAl_{12-y}O_{19}$ with o z x] $Sr_{1-x}La_xMg_{x-y}Co_yAl_{12-x}O_{19}$ *with* $0<y<x$).

The compound YAP, doped with cobalt (or $YAlO_3:Co^{2+}$).

YAG doped with $Co^{2+}$ of formula $Y_3Al_{5-2x}Co_xSi_xO_{12}$, the $Si^{4+}$ ion making it possible to carry out a charge compensation.

Solid solutions based on YAG and doped with $Co^{2+}$, said matrixes being garnets derived from YAG ($Y_3Al_5O_{12}$). The aluminium ion (Al) is progressively replaced by gallium ions (Ga) or scandium ions (Sc) ($Y_3Al_{5-x-y}Ga_xSc_yO_{12}$). Another possible solid solution is obtained by replacing yttrium by lutetium, which gives $Y_{3-x}Lu_xAl_5O_3$, which can itself be doped with cobalt $Co^{2+}$. The formulas of these doped materials are respectively $Y_3Al_{5-x-y-2z}Ga_xSc_yCo_zSi_zO_{12}$ and $Y_{3-x}Lu_xAl_{5-2y}Co_ySi_yO_3$.

In all these materials, the cobalt has a wide absorption band around 1.5 $\mu$m. The width of this band and its wavelength position are dependent on the matrix, but the band always remains close to 1.5 $\mu$m and is at least between 1.5 and 1.6 $\mu$m.

In all these compounds, the $Co^{2+}$ ion will be substituted with greater or lesser ease in the chosen matrix. With regards to LMA, said material contains $Mg^{2+}$ ions, which can be substituted with cobalt ions without charge compensation. The same situation arises for $CaF_2$, $MgF_2$, $SrF_2$ and $BaF_2$, as well as for ASL. The other compounds involve a charge compensation.

All these compounds can also be deposited in thin film form, e.g. by liquid phase or molecular beam epitaxy or by the sol-gel method.

These compounds can also be obtained by Czochralski pulling (reference can e.g. be made in this connection to the thesis of C. Borel given on Nov. 12, 1990 at Paris VI University, pp 43–48) in solid form.

Molecular beam epitaxy is e.g. described in the thesis of E. Daran given on Apr. 28, 1994 at INSA Toulouse, pp 57–60 and 64–76.

The sol-gel method is described in the document published in SPIE, vol. 1794, Integrated Optical Circuits, p 303, 1992.

EP-653 824 gives detailed information on processes for producing saturable absorber films by liquid phase epitaxy. For example, for obtaining a cobalt-doped film, it is possible to use a bath with the following composition:

Pb/B : 12

Al/Y=4 (formation of the phase $Y_3Al_5O_{12}$)

Al/Co=10 to start, because the cobalt easily takes the place of the aluminium.

To obtain the value II ($Co^{2+}$) of the cobalt, silicon in oxide form $SiO_2$ is introduced into the bath. The silicon is there for compensating the charge of the cobalt $Co^{2+}$ by a $Si^{4+}$ ion, both in substitution for 2 aluminium $Al^{3+}$ ions. The molar concentration of the silicon is the same as that of the cobalt.

In thin film form (sol-gel film or epitaxied film), the thickness of the saturable absorber films can be much less than in the case of solid saturable absorbers. Thus, a few to about one hundred microns is sufficient for obtaining a correct absorption coefficient for the operation of the laser. Thus, due to said limited thickness, the overall dimensions of the microlaser remain small, particularly when the laser medium serves as a substrate for the deposition of the film.

Optionally and as explained in the article by A. Eda et al, CLEO'92, paper CWG33, p 282 (Conf. on Laser and Electrooptics, Anaheim, U.S.A., May 1992), it is possible to produce an array of microlenses in a transparent material (silica, etc.) on the surface of the laser material. The typical dimensions of these microlenses are a diameter of one hundred to a few hundred microns and radii of curvature of a few hundred micrometers to a few millimeters. These microlenses are used for producing "stable" cavities (the "plane-plane" cavity is not stable) of the plano-concave type. In the case of an optical pumping, they also make it possible to focus the pumping beam.

In order to produce a complete laser cavity, the active medium with its saturable absorber layer or layers will be located between two mirrors 6, 8. The input mirror, deposited by known processes, will preferably be a dichroic mirror having a maximum reflectivity (as close as possible to 100%) at the wavelength of the laser and the highest possible transmission (>80%) at the wavelength of the pump (generally about 980 nm for Er-doped materials). The output mirror is also of the dichroic type, but permits the passage of a few per cent of the laser beam.

The advantage of such a structure is immediately clear, because at no time does it require an optical alignment of the different components. It also avoids problems linked with a structure, where the active medium is codoped with active laser ions and saturable absorber ions. Thus, there is a separation of the active medium and the saturable absorber medium and it is possible to regulate and choose independently the thicknesses and concentrations of the ions in said two media, hence a greater design freedom for the same.

The pumping of such a cavity is preferably an optical pumping. Thus, a laser diode at 980 nm is particularly suitable for the envisaged wavelength range.

The microlaser cavity can be placed in a mechanical box intended to receive the laser pumping diode. It is also possible to have two separate boxes, one for the microlaser cavity and the other for pumping laser diode, both boxes being linked by an optical fibre, with the aid of a connector provided in each box. These structures are illustrated by EP-653 824.

The invention also relates to a process for the production of a microlaser cavity, as described hereinbefore. This production can take place according to the following stages, all compatible with collective production. The process differs as a function of the saturable absorber type. The saturable absorber can be in the form of a film deposited on the laser material (case A), a solid material conditioned in thin strip form and bonded to the laser material (case B), or a mixture of the two technologies (case C): deposition of the film on a neutral substrate (e.g. silica) and assembly with the laser material. This substrate can then be removed using known microelectronics processes (e.g. etching an intermediate lift-off layer).

The following stages can be distinguished in said process or processes:

1) The first stage consists of choosing the active laser material. A description has already been given of the different possible materials ($YVO_4$, YSO, YAG, LMA, etc.), as well as the different criteria enabling the expert to choose among said different materials.

2) The second stage will be a stage of conditioning the chosen laser crystal. It is oriented and cut into strips with a thickness between 0.5 and 5 mm, and e.g. a diameter of 25 mm, optionally as a function of the crystal axes for an anisotropic crystalline material. It is e.g. possible to use a diamond blade saw.

3) The third stage consists of grinding and polishing the strips and has two objectives:

on the one hand removing the surface, work hardening layer resulting from the cutting, on the other hand, bringing the thickness of the strips to a level slightly exceeding the specification of the microlaser, the active medium thickness being a parameter conditioning certain microlaser characteristics (width of the spectrum and number of longitudinal modes). The ground strips close to the final thickness are polished on the two faces with an optical quality.

4) A stage of preparing a saturable absorber.

As stated hereinbefore, several types of preparation can be carried out, corresponding to the different saturable absorber types.

4A. Deposition of Saturable Absorber Films (Structure of FIG. 1)

4A1) Chemical preparation of the material to be deposited (e.g. preparation of the colloidal solution forming the precursor of the sol-gel, using a process described in the article of Q. He et al entitled "Rare Earth Doped Aluminium Phosphate Sol-Gel Films" published in SPIE, vol. 1794, Integrated Optical Circuits II, 1992, p 303, preparation of the molten bath for epitaxy and for molecular beam epitaxy reference can be made to the aforementioned thesis of E. Daran (p 68).

4A2) Deposition of the material in film form, according to a known, specific process (e.g. deposition with a whirler of the colloidal, sol-gel precursor solution, liquid phase epitaxy of a saturable absorber material and deposition by molecular jet epitaxy).

4A3) Repolishing the strips, with a view to removing any roughness caused by the deposition process and for bringing the thickness of the deposited film to the desired thickness for the operation of the microlaser (for a film said thickness is between 1 and 200 $\mu$m e.g. 10, 50, 100, 150 $\mu$m).

4A4) Possible etching of spherical microsurfaces on the polished state, according to the aforementioned prior art in connection with microoptical components. This stage can optionally take place prior to the deposition of the saturable absorber layer.

4A5) Deposition of dielectric input and output mirrors on plates, e.g. cold. These are preferably dichroic mirrors, obtained by a deposition of dielectric multilayers.

Stage 4A4 can be performed before or after stages 4A1, 2 and 3, except in the case of liquid phase epitaxy, which takes place at a high temperature and may destroy the microsurfaces. The micro-etching of the spherical surfaces (4A4) can be carried out before or after the film deposition stages.

4B. Solid Saturable Absorber

Figure 2:
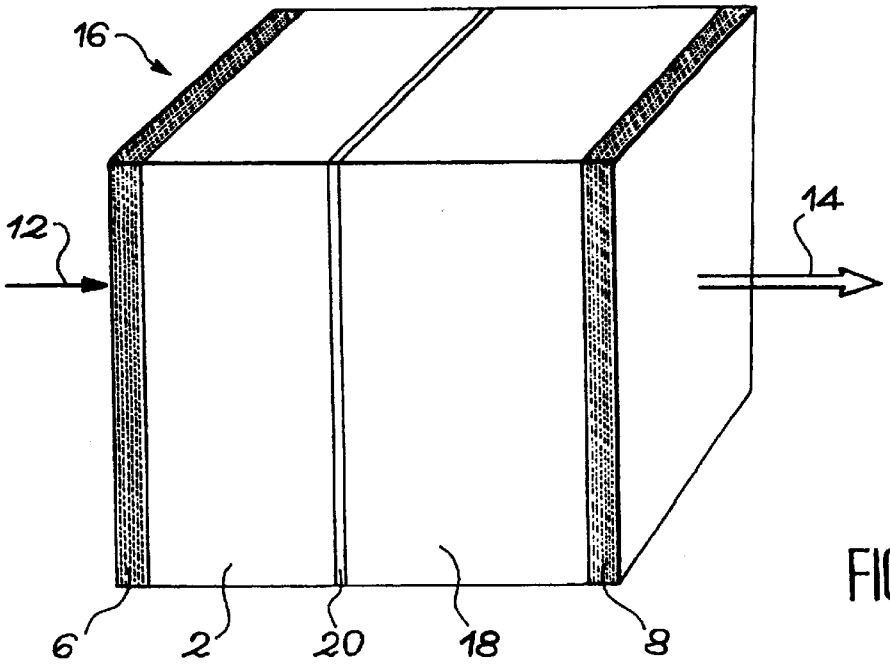
FIG. 2 Diagrammatically another microlaser structure according to the invention.

It then has the structure of FIG. 2, where references identical to those of FIG. 1 designate the same elements. The saturable absorber is designated by the reference 18.

4B1) Cutting the saturable absorber material, e.g. prepared by Czochralski pulling.

4B2) Polishing the two faces of the plates (planar, parallel faces).

4B3) Deposition of the input mirror on the laser material and the output mirror on the saturable absorber, or vice versa, using methods described in 4A5).

4B4) Assembly of a strip of laser material and a strip of saturable absorber material, e.g. by bonding under a press (reference 20 designating an adhesive film) or according to the process described in French patent application 96 08943 of Jul. 17, 1996 (assembly by intimate contact or molecular adhesion). The mirrors are outside the assembly.

4C) Mixed Technology

Figure 3:
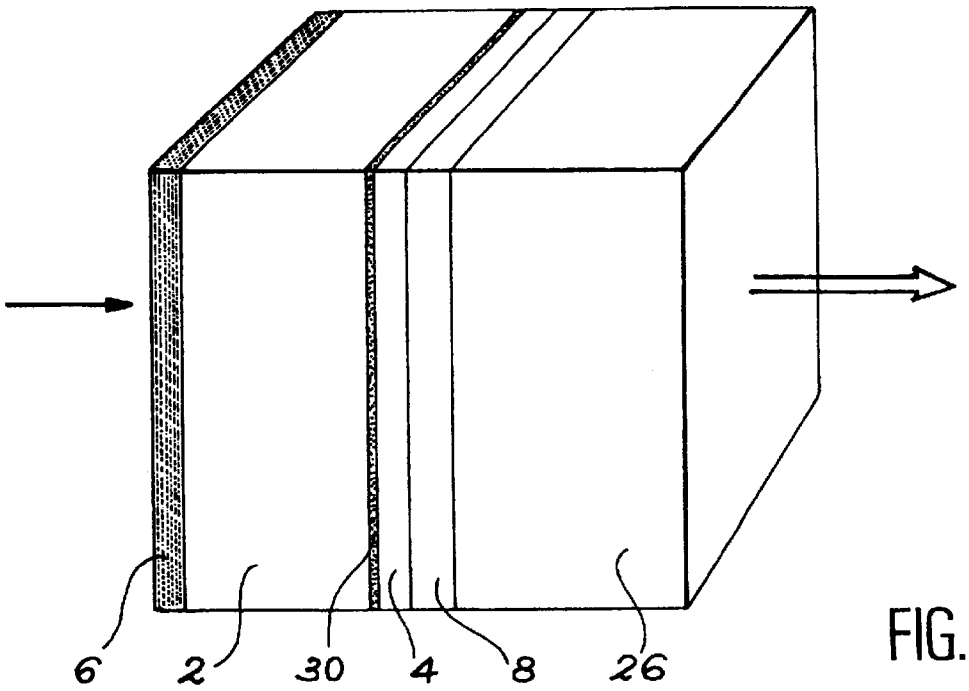
FIGS. 3 & 4 Stages in the production of a microlaser according to the invention.
Figure 4:
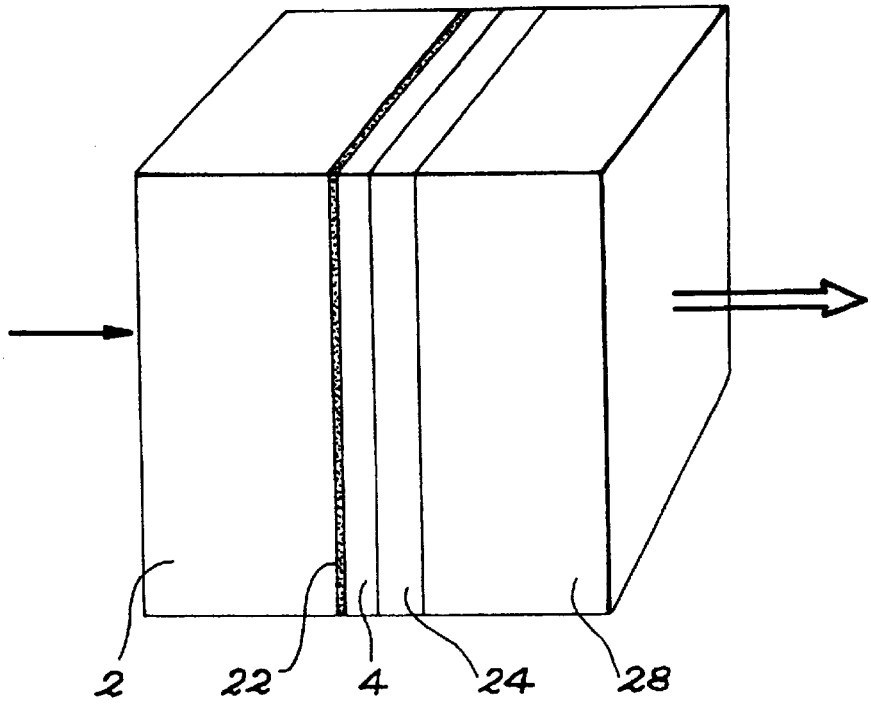

This case is illustrated in FIGS. 3 and 4. In the case of FIG. 3, the saturable absorber 4 is previously produced on a mirror film 8 and even on a substrate 26, by a film deposition method of the type described hereinbefore. The substrate can be transparent at the emission wavelength of the laser beam, in which case it does not have to be eliminated. The saturable absorber-mirror 8-substrate assembly is then assembled with the active laser medium 2 by an adhesive coating 30.

In the case of FIG. 4, the saturable absorber 4 is produced on a lift-off layer 24 to be etched and even formed on a substrate 28. The assembly is connected to the amplifier medium 2 with the aid of an adhesive coating 22. The layer 24 is then etched, which makes it possible to eliminate the substrate 28. The mirrors can then be produced in the aforementioned manner.

The process becomes common to the following stages:

5) Cutting individual microlaser chips with a surface of approximately 1 $mm^2$ using a diamond circular saw (identical to that used in microelectronics).

6) Connection of the pumping diode to the microlaser.

As stated, it is also possible to mix these two processes. Use is made of a transfer method such as a lift-off, which is well known in the art, in order to assemble the saturable absorber part with the laser material and then remove the deposition substrate.

PERFORMANCE EXAMPLE

A LMA:Co crystal was produced and doped with 0.3% of $Co^{2+}$ cobalt ions, which amounts to substituting for the $Mg^{2+}$ ion in the formula of LMA ($La_{0.9}Mg_{0.5}Al_{11.433}O_{19}$). With cobalt doping said formula becomes $La_{0.9}Mg_{0.4985}Co_{0.0015}Al_{11.433}O_{19}$.

The crystal is oriented <100>. This crystal was cut into small lamellas of diameter 5 mm. Different thicknesses were produced: 500, 750 and 1000 $\mu$m. The two faces of the lamellas are polished, so as to obtain two faces which are as planar and parallel as possible. These lamellas are mechanically assembled with a Yb—Er-doped glass lamella, which is the laser material, and two mirrors forming the laser cavity. The mirrors are produced by a multilayer dielectric treatment. They are designed to operate at 1.5 $\mu$m, which is the wavelength used here. The glass:Er, Yb used is a material bought from Kigre, U.S.A. It has the following Er and Yb composition: 0.6 to 0.8 wt. % erbium oxide and 20 wt. % ytterbium oxide. A 0.5 or 0.75 or 1 mm thick glass lamella was used and polished in order to obtain two planar, parallel faces.

The cavity is pumped by a laser diode emitting at around 980 nm (bought from Spectra Diode Labs, U.S.A.).

The typical results obtained are:

repetition frequency : 1 to 50 kHz, pulse duration : 5 to 20 ns, mean power : 10 to 20 mW, pulse energy : 5 to 10 $\mu$J.

Another LMA:Co material doped with 0.15 instead of 0.3% made it possible to obtain pulses with an even higher frequency (100 kHz and higher).

The production process described hereinbefore offers the possibility of producing microlasers on a large scale and therefore at low cost, which is important for applications in fields such as cars. In addition, the thus produced microlaser has the already mentioned advantages, namely monolithic, i.e. of flexible use, and requires neither optical setting, nor alignment, because the monolithic production process permits a self-alignment of the laser. Moreover, the microlasers according to the invention make it possible to attain high repetition frequencies (200 Hz and higher).

Among the possible industrial applications of microlasers, reference can be made to laser telemetry, laser micromachining and marking, laser injection (for power lasers), the detection of pollutants, scientific and medical instrumentation, etc.

Moreover, the combination of microlasers and microoptical technologies (microlenses), whilst maintaining the advantage of collective and therefore low cost production, makes it possible:

- to improve the performance characteristics of the microlasers (stable cavities, focussing of the pump),
- to produce optical Microsystems intended for particular applications, such as:
  - the production of 2D (optionally addressable) networks,
  - micro-lidar (remote sensing of wind speeds, pollution, etc.),
  - obstacle detection for cars,
  - laser telemetry,
  - compact, low cost, laser marking machines.

Several of these applications, particularly marking, micro-lidar, obstacle detection, telemetry, etc. require high peak powers and therefore a switched operation. The microlaser according to the invention lends itself well to such applications.

With a view to the production of a telemeter, the microlaser according to the invention can be combined with a device for measuring the duration of a time interval, as described e.g. in EP-706 100 or French patent application 96 02616 of Mar. 1, 1996. The device also incorporates means for receiving a light pulse reflected by an object and for detecting the reception instant of said pulse, as well as means for detecting the emission instant of a pulse from the microlaser. Such a telemeter can be installed on cars in order to avoid collisions or assist the driving of the car in the case of poor visibility.

We claim:

1. Microlaser cavity incorporating:

a solid active medium emitting at least in a wavelength range between 1.5 and 1.6 $\mu$m and a saturable absorber of formula $CaF_2:Co^{2+}$ or $MgF_2:Co^{2+}$ or $SrF_2:Co^{2+}$ or $BaF_2:Co^{2+}$ or $La_{0.9}Mg_{0.5-x}Co_xAl_{11.433}O_{19}$ or $YAlO_3:Co^{2+}$ or [$YAl_{5-2x}Co_xSi_xO_3$] $YAl_{(1-2x)}Co_xSi_xO_3$ or $Y_3Al_{5-x-y}Ga_xSc_yO_{12}:Co^{2+}$ or [$Y_3Al_{5-x-y-2z}Ga_ySc_zCo_zSi_zO_{12}$] $Y_3Al_{5-x-y-2z}Ga_xSc_yCo_zSi_zO_{12}$ or [YLuAlO:$Co^{2+}$ or $Y_{3-x}Lu_xAl_5{}_{12}CoSiO$] $Y_{3-x}Lu_xAl_5O_{12}:Co^{2+}$ or $Y_{3-x}Lu_xAl_{5-2y}Co_ySi_yO_{12}$ or [$Sr_{1-x}Mg_xLa_yAl_{12-y}O_{12}:Co^{2+}$ or $Sr_{1-x}Mg_{x-y}Co_yLa_zAl_{12-z}O_{12}$, (with o<y<x] $Sr_{1-x}La_xMg_xAl_{12-x}O_{19}:Co^{2+}$ or $Sr_{1-x}La_xMg_{x-y}Co_yAl_{12-x}O_{19}$, (with $0<y<x$ for the latter compound).

2. Microlaser cavity according to claim 1, the saturable absorber being in the form of a film.

3. Microlaser cavity according to claim 2, the film having a thickness between 1 and 150 $\mu$m.

4. Microlaser cavity according to claim 2 or 3, the film having been obtainable by the sol-gel method, or by molecular beam or liquid phase epitaxy.

5. Microlaser cavity according to claim 1, the solid active medium being constituted by a base material chosen from among $Y_3Al_5O_{12}$ (YAG), $LaMgAl_{11}O_{19}$ (LMA), $Y_2SiO_5$ (YSO), $GdVO_4$, $Y_3Sc_2Ga_3O_{12}$ (YSGG), $SrY_4(SiO_4)_3O$ (SYS), $Ca_2Al_2SiO_7$ (CAS) and doped either with erbium or with chromium or with an erbium-ytterbium codoping, or an erbium-ytterbium-cerium codoping.

6. Microlaser cavity according to claim 1, the solid active medium being a phosphate glass doped with erbium and ytterbium, the erbium an ytterbium doping operations being respectively at between 0.5 and 0.9 and between 15 and wt. % oxide.

7. Microlaser cavity according to claim 1, the cavity being stable.

8. Microlaser cavity according to claim 7, having an input mirror and an output mirror, at least one of the two mirrors being concave.

9. Microlaser cavity according to claim 1, also having a microlens directly formed on the laser material.

10. Process for the production of a microlaser cavity involving the production of a saturable absorber of formula $CaF_2:Co^{2+}$ or $MgF_2:Co^{2+}$ or $SrF_2:Co^{2+}$ or $BaF_2:Co^{2+}$ or $La_{0.9}Mg_{0.5-x}Co_xAl_{11.433}O_{19}$ or $YAlO_3:Co^{2+}$ or [$YAl_{5-2x}Co_xSi_xO_3$] $YAl_{(1-2x)}Co_xSi_xO_3$ or $Y_3Al_{5-x-y}Ga_xSc_yO_{12}:Co^{2+}$ or $Y_3Al_{5-x-y-2z}Ga_xSc_yCo_zSi_zO_{12}$ or $Y_{3-x}Lu_xAl_5O_{12}:Co^{2+}$ or $Y_{3-x}Lu_xAl_{5-2y}Co_ySi_yO_{12}$ or [$Sr_{1-x}Mg_xLa_yAl_{12-y}O_{12}:Co^{2+}$ or $Sr_{1-x}Mg_{x-y}Co_yLa_zAl_{12-z}O_{12}$ (with o<y<x] $Sr_{1-x}La_xMg_xAl_{12-x}O_{19}:Co^{2+}$ or $Sr_{1-x}La_xMg_{x-y}Co_y Al_{12-x}O_{19}$, (with $0<y<x$ for the latter compound).

11. Process according to claim 10, also involving the conditioning to a predetermined thickness of the constituent material of the solid active medium.

12. Process according to one of the claims 10 or 11, the saturable absorber being produced in film form.

13. Process according to claim 12, the film having a thickness between 1 and 150 $\mu$m.

14. Process according to claim 12, the saturable absorber being produced by epitaxy or the sol-gel method.

15. Process according to claim 12, the saturable absorber being produced from a solid material conditioned in thin strip form.

16. Process according to claim 15, the thin strip being bonded to the active laser material.

17. Process according to claim 15, the thin saturable absorber strip and the laser active medium being assembled by bonding, intimate contact or molecular adhesion.

18. Process according to claim 12, the film being directly produced on the active laser medium.

19. Process according to claim 12, the film being previously deposited on a substrate, which is then assembled with the laser medium.

20. Process according to claim 19, the substrate then being removed.

21. Laser telemetry device operating on the principle of the measurement of the travel time of a light pulse, characterized in that it comprises:

a passively switched microlaser having a microlaser cavity according to claim 1, means for receiving a light pulse reflected by an object and detection of the reception time of said pulse, means for detection of the emission time of a pulse from the microlaser, a device for measuring the time interval separating the emission time of a microlaser pulse from the reception time of a reflected beam.

22. Car equipped with a telemeter according to claim 21.

*23. Process according to claim 10, the solid active medium constituted by a base material being chosen from among* $Y_3Al_5O_{12}$ *(YAG),* $LaMgAl_{11}O_{19}$ *(LMA),* $Y_2SiO_5$ *(YSO),* $GdVO_4$, $Y_3Sc_2Ga_3O_{12}$ *(YSGG),* $SrY_4(SiO_4)_3O$ *(SYS),* $Ga_2Al_2SiO_7$ *(CAS) and doped either with erbium or with chromium or with an erbium-ytterbium codoping, or an erbium-ytterbium-cerium codoping.*

* * * * *